Figure 4:
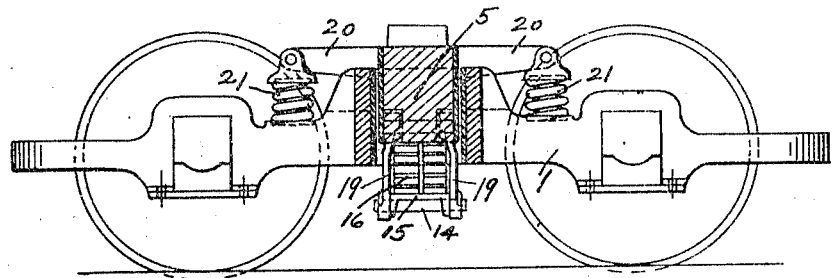

C. E. SMITH.
EQUALIZING CAR TRUCK.
APPLICATION FILED OCT. 13, 1912. RENEWED JULY 30, 1913.
1,107,857.
Patented Aug. 18, 1914.
2 SHEETS—SHEET 1.
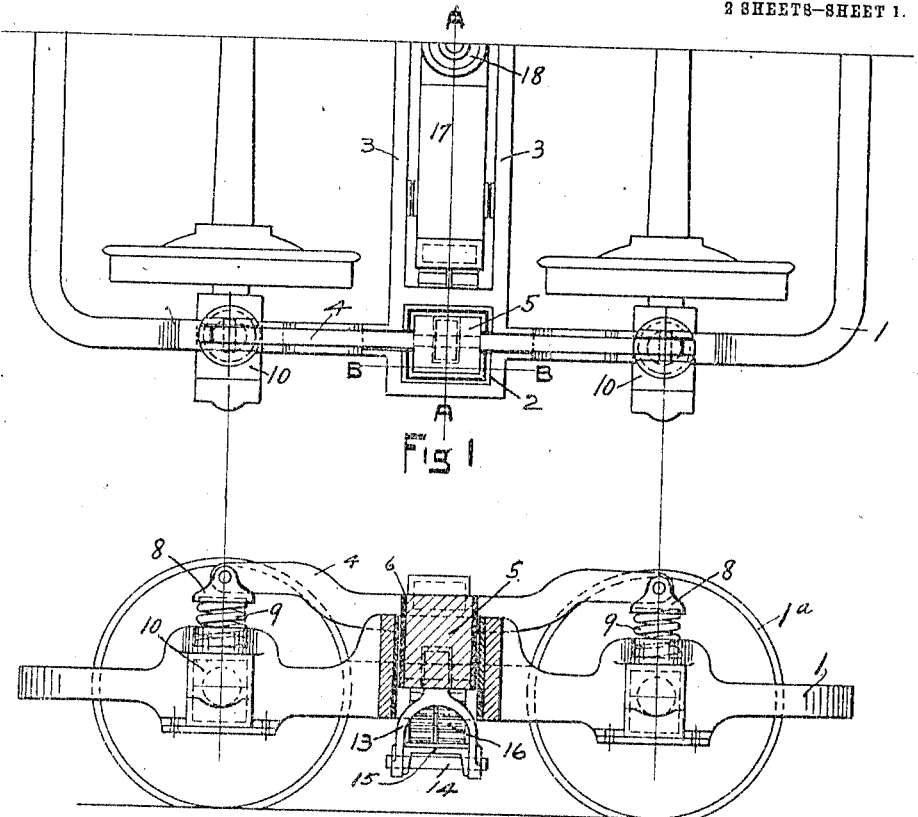
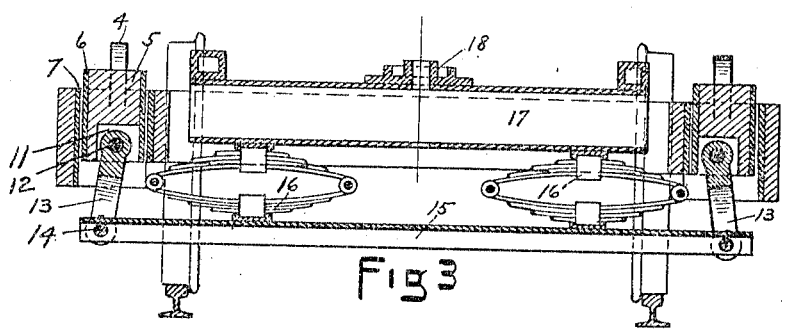
WITNESSES:
Agnes Geoghegan
Stella Hill
INVENTOR
Clarence E. Smith
BY
Bruce A. Smith
ATTORNEY C. E. SMITH.
EQUALIZING CAR TRUCK.
APPLICATION FILED OCT. 16, 1912. RENEWED JULY 30, 1913.

1,107,857.

Patented Aug. 18, 1914.

2 SHEETS—SHEET 2.

WITNESSES:
Agnes Geoghegan
Stella Hill.

INVENTOR
Clarence E. Smith
BY
Bruce A. Elliott
ATTORNEY

UNITED STATES PATENT OFFICE.

CLARENCE E. SMITH, OF ST. LOUIS, MISSOURI, ASSIGNOR TO DOUBLE BODY BOLSTER CO., OF ST. LOUIS, MISSOURI, A CORPORATION OF NEW JERSEY.

EQUALIZING CAR-TRUCK.

1,107,857.  Specification of Letters Patent.  Patented Aug. 18, 1914.

Application filed October 16, 1912, Serial No. 725,969. Renewed July 30, 1913. Serial No. 782,138.

*To all whom it may concern:*

Be it known that I, CLARENCE E. SMITH, a citizen of the United States, residing in the city of St. Louis and State of Missouri, have invented new and useful Improvements in Equalizing Car-Trucks, of which the following is a specification.

This invention relates to car trucks, and particularly to an equalizing support for the car body.

The principal object of the invention is to provide a support for the car body which shall not only equalize the weight thereof, but shall be so associated with the truck frame as to make the same entirely independent of the movement of the car body.

The salient feature of the invention resides in the provision of equalizing bars at each side of the truck frame which are supported at their ends on the truck frame, or the journal box, on springs, which equalizing bars, through the medium of central hangers, are connected beneath the truck frame by a spring plank, on which are mounted elliptical springs, which, in turn, support the car body. This construction affords many advantages, which it is thought will be better understood after reading the detailed description of the invention, and the statement thereof, accordingly, will be made later on in the specification.

I wish to state, however, that the purpose of the invention may be accomplished in various ways, and the constructions shown in the drawings, and hereinafter described, are intended to illustrate the best means now known to me for accomplishing the objects of my invention. Also that my improved equalizing mechanism is applicable to trucks for all kinds of cars, including street, passenger and freight cars.

Figure 5:
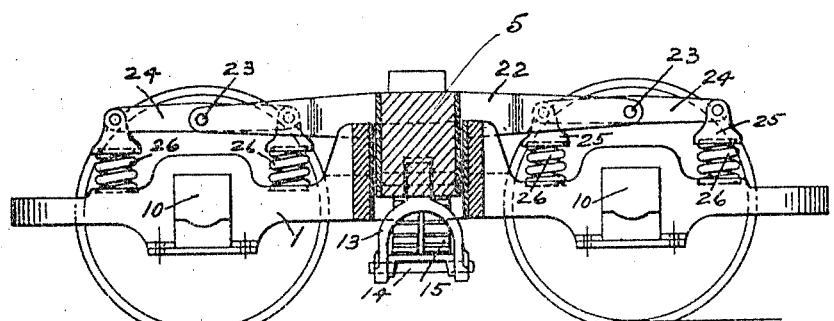
Figure 6:
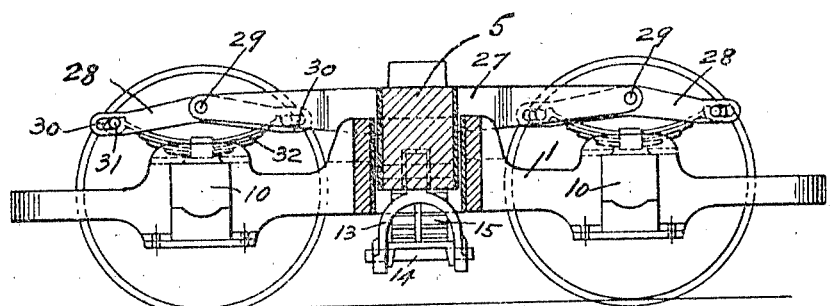

In the accompanying drawings: Figure 1 is a plan view of one-half of a truck frame constructed according to my invention; Fig. 2 is a side elevation and section on the line B—B of Fig. 1; Fig. 3 is a cross sectional view on the line A—A of Fig. 1; Fig. 4 is a view similar to Fig. 2, but illustrating a modified construction of hanger for supporting the spring plank; Fig. 5 is also a view similar to Fig. 2, but illustrating a modification in the manner of supporting the equalizing bar from the truck frame; and Fig. 6 is a view similar to Fig. 5 and illustrating a further modification in the manner of supporting the ends of the equalizing bar.

Referring now to the drawings, 1 indicates the truck frame, and 1ª the wheels thereof. The truck frame, in general, is of the usual construction, but differs from the ordinary truck frame in being provided at opposite sides with rectangular pockets 2 located at opposite ends of the transom bars 3. The construction at each side of the truck frame is identical, and a description of the parts located at one side of the truck frame, which will now be given, will apply equally well to the other.

The numeral 4 indicates an equalizing bar, which is provided centrally of its length with an integral rectangular member 5, which I will term a guide-block. This guide-block is received, and works in the pocket 2, but to prevent wear between the guide-block and the walls of said pocket the guide-block is surrounded by removable wear plates 6, and the pocket 2 is provided on its interior with removable wear plates 7, the wear plates 6 fitting loosely in the wear plates 7 so as to prevent constant frictional contact. The equalizing bar 4 carries at each end a spring cap 8 which receives the upper end of a coil spring 9, the lower end of which is secured over the top of the journal box 10. The guide-block 5 is recessed on its under side, as indicated at 11, and pivotally mounted in said recess, by means of a pivot-pin 12, is a bifurcated hanger 13, between the jaws of which is pivotally mounted and secured, by means of a pivot-pin 14, a spring-plank 15, the said spring-plank being supported at its opposite ends from corresponding hangers 13, as shown by Fig. 3. Secured on the spring-plank 15 are two elliptic springs 16, which, in turn, support the truck bolster 17, having a center plate 18.

From the construction above described, it will be seen that any downward movement of the car body, which in the case of each of the trucks supporting the car body will be transmitted at the center plate 18 to the bolster 17, will result first in pressure upon the springs 16, thence through the spring-plank 15 upon the equalizing bars 4, and thence through the springs 9 upon the truck frame 1. Such movement is practically absorbed, therefore, before the effect thereof can be exerted upon the truck frame. Conversely, if the wheels 1ª pass over an obstacle, causing the truck frame to rise, such movement will first be taken up by the springs 9, then, through the equalizing bars 4 and spring-plank 15, by the springs 16, and will be practically absorbed before it can influence the position of the bolster 17, or the car body. Thus the movement of the car body has practically no tendency to move the truck frame, and conversely the movement of the truck frame has no influence upon the car body. As a result of this construction I secure some very highly advantageous results in operation, among which may be mentioned an even wear of the journal brasses; a substantially rigid and solid foundation for supporting the motors, when the invention is applied to a motor car, as the motors rest on the axle and truck frame only; a solid resistance for the truck brake-rigging, which is suspended from the truck frame; elimination of the wear and noise that is characteristic of the "pedestal type" frame in common use, which moves up and down under the influence of the coil springs; and, finally, the prevention of the jarring often noticed when brakes are applied to the "pedestal type" truck. The latter advantage is quite an important one, as the movement of the brake-rigging, which, as stated, is suspended on the truck frame, is highly objectionable and many attempts have been made to overcome it. By my invention, which permits the truck frame to remain practically rigid under all conditions of service, the brake-rigging likewise remains stationary, and besides is given a solid resistance when the brakes are applied. The result is not only manifested in greater comfort to the passengers; but in the elimination of the strain and wear on the parts occasioned by the movement of the truck frame, especially when the brakes are applied, I decrease to a high degree the wear and breakage of the parts with the resultant advantage of increased economy and safety in operation.

The construction shown in Fig. 4 is the same in principle as that above described, but in this case I employ double hangers 19 supported from opposite sides of the guide-block 5, as shown by the dotted lines in Fig. 4, while the equalizing bar 20 is made shorter and is supported by coil springs 21 at its opposite ends directly on the side bar of the truck frame 1.

In Fig. 5 the equalizing bar 22 is bifurcated and is pivotally mounted at its ends, as indicated at 23, centrally of a short bar 24, which bar carries spring caps 25 at opposite ends in which are secured the upper ends of coil springs 26, which rest upon the side bar of the truck frame 1 at opposite sides of the journal boxes 10.

In Fig. 6 the equalizing bar 27 is bifurcated at its ends and embraces at each end a short bar 28 to which it is pivotally secured at the center, as indicated at 29, the said bar 28 being provided at its ends with elongated slots 30, which receive pins 31 in the opposite ends of a composite leaf-spring 32, which springs are mounted over the journal box 10.

The construction shown in Fig. 1, and those shown in Figs. 4, 5 and 6, can be interchanged or variously combined to suit conditions.

I claim:

1. In a car truck, in combination with a truck frame rigidly mounted with respect to the axles, a pair of equalizing bars located, respectively, at opposite sides of the truck frame and supported at opposite ends thereon by springs, and a spring-plank supported at its ends from said equalizing bars.

2. In a car truck, in combination with a truck frame rigidly mounted with respect to the axles, a pair of equalizing bars located, respectively, at opposite sides of the truck frame and supported at opposite ends thereon by springs, and a spring-plank pivotally supported at its ends from said equalizing bars.

3. In a car truck, in combination with a truck frame rigidly mounted with respect to the axles, a pair of equalizing bars located, respectively, at opposite sides of the truck frame and supported at opposite ends thereon by springs, and a spring-plank pivotally supported at its ends from said equalizing bars centrally of the latter.

4. In a car truck, a truck frame provided at opposite sides with guide-pockets, a pair of equalizing bars located, respectively, at opposite sides of the truck frame and having central guide-blocks, respectively working in said pockets, a spring-plank extending from side to side of the truck frame, and hangers pivotally mounted in said guide-blocks and connected at their lower ends, respectively, to opposite ends of said spring-plank.

5. In a car truck, a truck frame provided at opposite sides with central guide-pockets, a pair of equalizing bars located, respectively, at opposite sides of the truck frame and provided with central guide-blocks, respectively working in said guide-pockets, a pair of spring-supported bars mounted on each side of the truck frame and pivotally connected intermediate their ends to opposite ends of the said equalizing bars, a hanger pivotally supported from each of said guide-blocks, and a spring-plank extending from side to side of the truck and pivotally connected at its ends to said hangers.

6. In a car truck, in combiantion with a truck frame rigidly mounted with respect to the axles and provided at opposite sides with guide-pockets, a pair of equalizing bars located, respectively, at opposite sides of the truck frame and supported at opposite ends thereon by springs and having central guide-blocks, respectively working in said pockets, a spring-plank extending from side to side of the truck frame, and hangers pivotally mounted in said guide-blocks and connected at their lower ends, respectively, to opposite ends of said spring-plank.

7. In a car truck, in combination with a truck frame rigidly mounted with respect to the axles and provided at opposite sides with central guide-pockets, a pair of equalizing bars located, respectively, at opposite sides of the truck frame and provided with central guide-blocks, respectively working in said guide-pockets, a pair of spring-supported bars mounted on each side of the truck frame and pivotally connected intermediate their ends to opposite ends of the said equalizing bars, a hanger pivotally supported from each of said guide-blocks, and a spring-plank extending from side to side of the truck and pivotally connected at its ends to said hangers.

8. In a car truck, in combination with a truck frame rigidly mounted with respect to the axles, a pair of equalizing bars located, respectively, at opposite sides of the truck frame, a pair of springs mounted on each side member of the truck frame and supporting opposite ends of said equalizing bars, and a spring-plank supported at its ends from said equalizing bars.

9. In a car truck, in combination with a truck frame rigidly mounted with respect to the axles, a pair of equalizing bars located, respectively, at opposite sides of the truck frame and supported at opposite ends thereon by springs, a spring-plank supported at its ends from said equalizing bars, a truck bolster, and springs mounted on said spring-plank and supporting said bolster.

10. In a car truck, a truck frame rigidly mounted with respect to the axles, a pair of equalizing bars, each of which is spring-supported at its ends upon a side member of the truck frame, a transverse spring-plank pivotally supported at its ends from said equalizing bars, springs mounted on said spring-plank, and a bolster mounted on said springs for supporting the car body.

11. A car truck frame consisting of side members, centrally located spaced transom members, and walls between said transom members forming a guideway for an equalizing bar.

12. The combination of a car truck having a guideway, supporting springs, and an equalizing bar having an integral member operating in said guideway, the ends of said bar coöperating with said springs.

13. The combination of a car truck frame having a guideway, an equalizing bar yieldingly supported upon said frame and operating in said guideway, and hangers connected to said equalizing bar for supporting the truck bolster.

14. The combination of a car truck frame, an equalizing bar yieldingly mounted thereon, hangers connected to said bar, and a bolster supported by said hanger.

15. The combination of a car truck frame having a centrally located guideway, an equalizing bar yieldingly supported at each end upon said frame and having a member operating in said guideway, hangers pivotally connected to said equalizing bar, and a bolster supported by said hangers.

16. The combination with a car truck frame, of an equalizing bar yieldingly supported upon said frame and having a centrally located guiding member coöperating with a guideway in said frame, carrying members connected to said guiding member and extending down under a bolster for supporting said bolster, and a bolster carried by said members.

In testimony whereof, I have hereunto set my hand in presence of two subscribing witnesses.

CLARENCE E. SMITH.

Witnesses:
BRUCE S. ELLIOTT,
STELLA HILL.